May 24, 1955

S. R. HIRSCH 2,708,945

LIQUID LEVEL CONTROL CIRCUIT

Filed Nov. 15, 1951

SYLVAN R. HIRSCH
*INVENTOR.*

BY *Robt Meyer*
*attorney*

May 24, 1955 S. R. HIRSCH 2,708,945
LIQUID LEVEL CONTROL CIRCUIT
Filed Nov. 15, 1951 2 Sheets-Sheet 2

SYLVAN R. HIRSCH
*INVENTOR.*

United States Patent Office 2,708,945
Patented May 24, 1955

2,708,945

LIQUID LEVEL CONTROL CIRCUIT

Sylvan R. Hirsch, Longmeadow, Mass., assignor to Worthington Corporation, Harrison, N. J., a corporation of Delaware Application November 15, 1951, Serial No. 256,559

3 Claims. (Cl. 137—392)

This invention relates generally to a liquid level control circuit and more particularly to a liquid level control circuit for the dispenser on a beverage dispensing machine wherein the current will not flow in such circuit when the dispenser is not in operation.

In the art of beverage dispensing apparatus, it has been found advantageous to dispense carbonated drinks from a separate vessel generally termed a carbonator in which either the carbonated water or the carbonated water and the syrup are stored, cooled, mixed and from which this fluid can be dispensed as needed.

To control the level of fluid in the carbonator various liquid level controls have been developed and are used in combination with the carbonator.

In the type of liquid level control which is operated electrically generally a water level relay circuit having spaced electrodes in the carbonator will be deactivated when the liquid level in the carbonator drops below a predetermined minimum point below the electrodes. This causes a switch for operating a pump circuit to close and hence the pump will pump fluid into the carbonator till the fluid reaches a predetermined maximum point which covers both electrodes and accordingly activates the water level relay circuit causing the switch to the pump circuit to be opened and hence the pump stopped.

In this abovementioned type of liquid level control which is operated electrically, it has been found that due to the fact that current is continually flowing across the electrodes at all times when they are immersed in the fluid in the carbonator that electrolytic action will take place causing the electrodes to erode and developing a heavy scale thereon which tends to cause erratic operation of the control circuit.

Since the carbonator must be filled in order to cool and mix the next portion of the fluid to be dispensed it is desirable to nullify this electrolytic action.

The present invention provides novel means for overcoming this difficulty and securing the desired result in a liquid level control of the type above described by means of a circuit tied in with the valve operating mechanism of the dispenser which short-circuits the electrodes in the water level relay control so that they will only actuate the water level relay when the shorting circuit is opened responsive to the level of the fluid in the carbonator at the time when the shorting circuit is opened.

Accordingly, it is an object of the present invention to prevent continuous current flow through the actuating means for a liquid level control.

It is another object of the present invention to short-circuit the flow of current through a water level relay so that it will by-pass a parallel circuit of higher resistance.

With this and other objects in view, as may appear from the accompanying specification, the invention consists of various features of construction and combination of parts, which will be first described in connection with the accompanying drawings, showing a liquid level control circuit of a preferred form embodying the invention, and the features forming the invention will be specifically pointed out in the claims.

Figure 1:
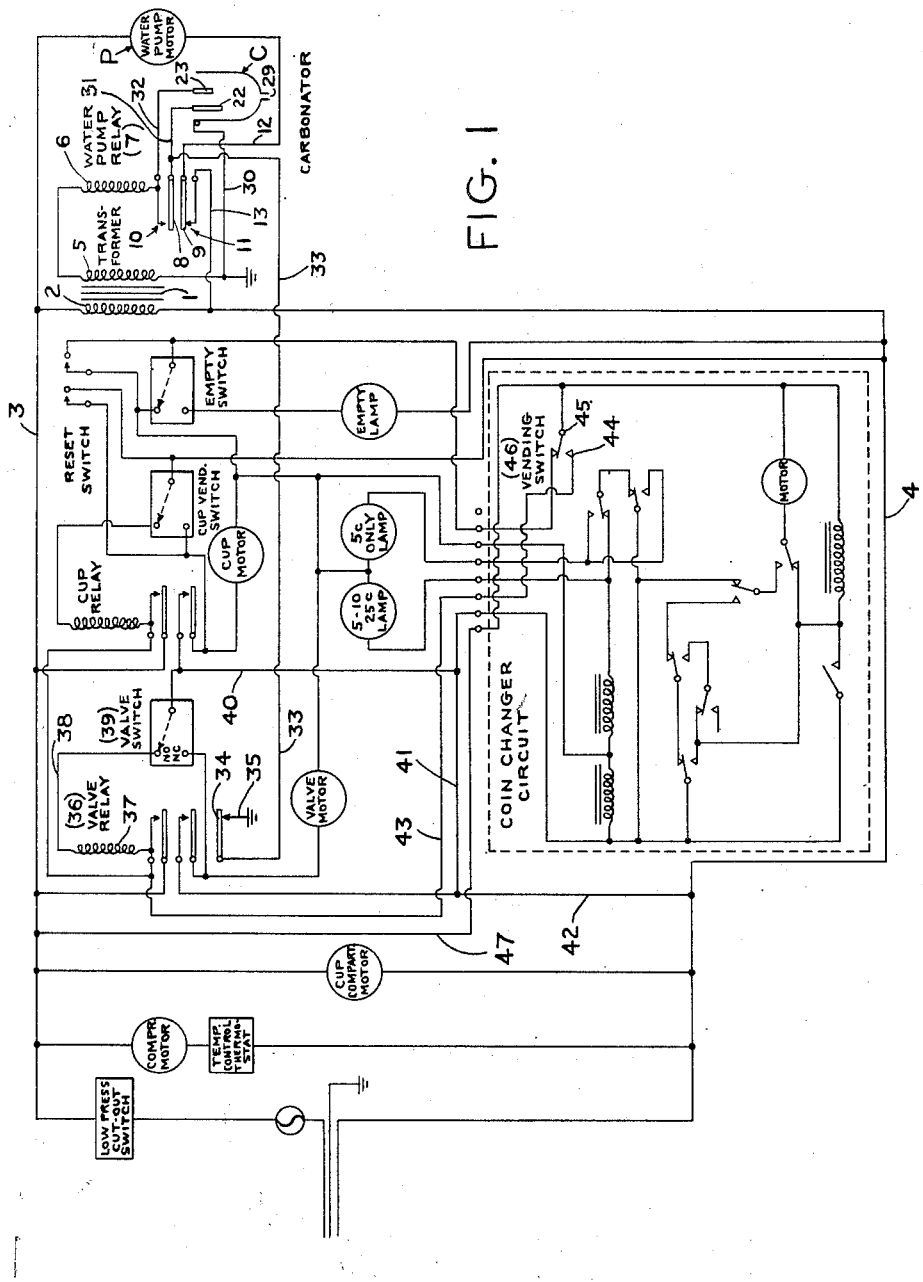
Figure 1 is a diagrammatic view showing an electrical circuit for a beverage dispensing machine including the liquid level control circuit and the pump controlled thereby with relation to the carbonator and the actuating and short-circuiting means for the liquid level control circuit.

Referring to the drawings Figure 1 shows a transformer 1 having a primary side 2 connected by line wires 3 and 4 to a source of alternating current. The secondary 5 is connected on one side to a coil 6 of a water pump relay 7 and the other side is grounded. The water pump relay 7 may be any standard type relay of the double pole one normally open and one normally closed switch type which is easily purchasable on the open market. Thus arms 8 and 9 actuate switches 10 and 11 respectively of the water pump relay 7 depending on whether current is passed through coil 6 or not.

Arm 9 is connected by pump line wire 12 to one side of the water pump motor P. The other side of the water pump motor P is connected to the line 3 and will therefore bring one of the sides of the alternating current source to the water pump motor P. The other side of the alternating current source is brought through line wire 13 connected between line 4 and switch 11.

In the normal position as further shown in Figure 1, no current is passing through the coil 6 or in other words the water pump relay 7 is not being actuated and switch 11 is therefor closed by arm 9 and alternate current is allowed to flow to both sides of the water pump motor P whereby it will be in operation and pump fluid into the carbonator C.

Figure 2:
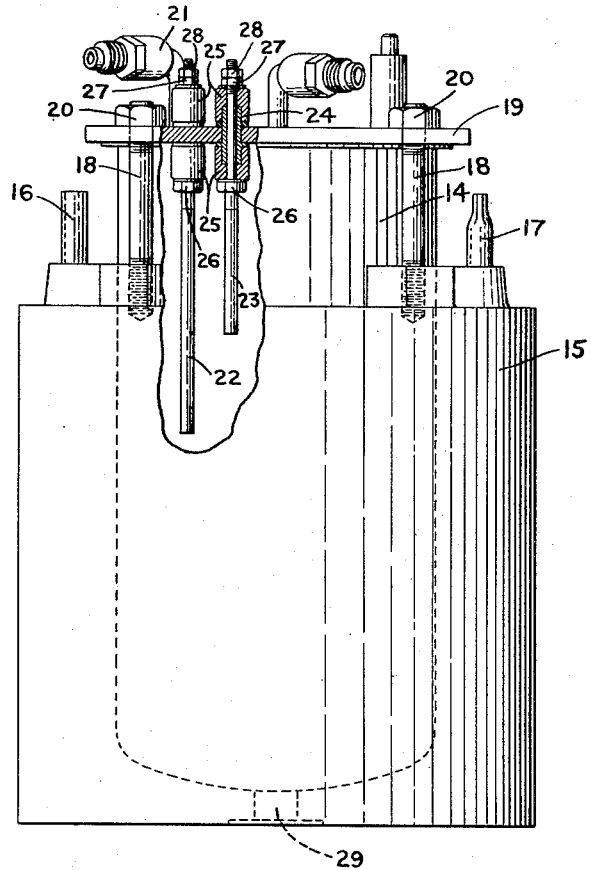
Figure 2 shows one type of carbonator used with the present invention.

The carbonator C is shown in Figure 2 and includes a tank 14 having a cooling jacket 15 surrounding the outer surface thereof with an inlet 16 and outlet 17 for the coolant. Spaced studs 18 are connected to the cooling jacket 15 and extend upwardly parallel to the axial line of the tank 14 to receive a removable closure means 19 thereon by threaded nuts 20. The closure means 19 covers the open end of the tank 14 transversely to the axial line thereof.

The closure means 19 includes therein a fluid intake 21 connected to the discharge of the pump (not shown) which opens into the tank through the closure means and provides means for filling the tank with water when the pump motor P is actuated.

Closure means 19 also has a long electrode 22 and a short electrode 23 which are identically mounted through the closure means 19 to extend into the tank 14 by means of hollow tubular insulators 24, washers 25 and a terminal stud 26 which is threaded on its outer end to receive an end nut 27 and lock nut 28. The long and short electrodes 22 and 23 will make and break contact with the fluid in the tank as it is drawn off through the outlet 29 or pumped in by the pump in accordance with the operation of the water pump motor P. Tank 14 is grounded through line wire 30 so that when fluid covers either of the electrodes current can pass from one or the other or both of the electrodes through the fluid in the tank 14 to ground by electrolytic action of the fluid.

This electrolytic action provides means whereby the long electrode 22 and short electrode 23 will be able to actuate the water pump relay 7 as they make and break contact through the rise and fall of the fluid in the tank 14 when the short circuiting means hereinafter described allows current to flow to the long and short electrodes 22 and 23. The long electrode 22 is therefore connected by a line wire 31 which is connected to the end extending outwardly of the closure means 19 between the end nut 27 and lock nut 28 to the arm 8 of the water pump relay 7. Similarly, the short electrode 23 is provided with a line wire 32 which is connected at one end to the end of the short electrode extending outwardly of the closure means 19 between the end nut 27 and lock nut 28 and at the other end to the switch 10 of the water pump relay 7.

Short circuiting means

The long electrode 22 and short electrode 23 for actuating the water pump relay circuit of the liquid level control will be short circuited when the carbonator C of the beverage dispensing apparatus is not dispensing fluid. This is accomplished as shown in Figure 1 by a wire 33 connected to line 31 between the arm 8 and long electrode 22 which leads to an arm 34 in normally closed relationship with the grounded side 35 of a standard type triple pole two normally open and one normally closed switches on valve relay 36 which is easily purchasable on the open market.

Valve relay 36 opens a valve (not shown) in the discharge outlet 29 of the tank 14 of the carbonator C and is activated and deactivated when current is passed through the coil 37 thereof. Thus coil 37 is connected at one end by wire 38 to valve switch 39 in turn connected through wires 40, 41 and 42 to the line wire 4. The valve switch 39 is operated by a timer (not shown) which regulates and mechanically activates the various steps of placing the cup, adding the syrup and dispensing the liquid in their respective order. However, since the timer does not form part of the present invention it is not shown or described. The other side of the coil 37 is connected by wire 43 to the contact 44 adapted to engage a switch arm 45 on the vending switch 46. The switch arm 45 is in turn connected through wire 47 to line wire 3.

Since line wire 3 and line wire 4 are connected to a source of alternating current when the timer (not shown) places the valve switch 39 into its normally open position as shown in Figure 1 the movement of the switch arm 45 by insertion of a nickel into the coin changer (not shown) into contact with contact 44 will pass current to the coil 37, activating the valve relay 36.

Operation

The insertion of a nickel into the coin changer will actuate the vending switch 46 which energizes valve relay 36, which opens the normally closed relay switch 35 of the valve relay 36 to remove the short circuit caused by line wire 33 across the wire 31 between arm 8 of the water pump relay 7 and the long electrode 22.

When this occurs the fluid level in the carbonator C will either be in contact with the long electrode 22 or below and out of contact with this electrode.

If the fluid in the carbonator is below and out of contact with the long electrode 22 no current can pass to the coil 6 through either electrode and the water pump relay 7 will be deactivated and the normally closed relay switch 11 of the water pump relay 7 will complete the circuit and place the water pump motor P into operation. Fluid will be pumped into the carbonator C as long as the water pump motor P continues to operate.

Water pump motor P will continue to operate until the level of the fluid in the carbonator C rises into contact with the short electrode 23. The electrolytic properties of the fluid will allow current to flow through the short electrode 23 to create a circuit through the coil 6 which activates the water pump relay 7 opening the normally closed relay 11 to break the circuit to the water pump motor P and stop its operation so fluid will no longer be pumped into the carbonator C.

When fluid is in contact with the short electrode 23 and coil 6 activates the water pump relay 7, a parallel circuit between the long electrode 22 through wire 31 and arm 8 and short electrode 23 through line 32 and the coil 6 through the fluid in the carbonator C which is grounded will be created.

It is obvious therefore that when the short circuit line 33 is opened as above described if there is fluid in contact with the long electrode 22 that the water pump relay 7 will continue to be activated and the circuit to the water pump motor P will remain open and no fluid will be pumped into the carbonator C.

Whenever the fluid level is high enough to be in contact with at least the long electrode 22 and the valve relay 36 is deactivated by the operation of the timer (not shown) which opens valve switch 39, the short circuit line 38 will create a circuit parallel to the above mentioned circuits of either or both of the long electrode 22 and short electrode 23 through the fluid in the carbonator C. However, by reason of the fact that the resistance of the short circuit line 33 is negligible compared to the electrolytic circuits through the fluid in the carbonator C current will flow through the short circuit line 33 and arm 34 to the grounded relay switch 35 rather than through the fluid whereby the electrolytic action between the electrodes and the fluid is stopped.

It will be understood that the invention is not to be limited to the specific construction or arrangement of parts shown but that they may be widely modified within the invention defined by the claims.

What is claimed is:

1. In a liquid level control, a tank having a discharge outlet for drawing fluid therefrom, a pump motor for operating a pump to pump fluid into said tank having a connection to a source of alternating current, a pump control circuit for controlling the operation of said pump motor operable by the level of fluid in said tank including, a transformer having the primary coil connected across the source of alternating current and a secondary coil, one end of said secondary coil connected to ground, a pump relay having a coil therein, the other side of said secondary coil connected to one side of said coil, one normally open switch and one normally closed switch on said pump relay, the normally open switch including a contact and an arm that contacts said contact, the other end of said coil connected to said contact and to a short electrode mounted in said tank, said arm connected to a long electrode mounted in said tank in spaced relation to said short electrode, said tank grounded to make a circuit through said coil when the fluid level is in contact with said electrodes, and said normally closed switch adapted to make and break the connection between the source of alternating current and said pump motor as the circuit is made and broken through the coil on the pump relay with the rise and fall of the water level in the tank the combination with said pump control circuit of, means for controlling the discharge of fluid from said tank, said means connected to said normally open switch on the pump relay for short circuiting said electrodes to prevent current flow therethrough when the fluid level in the tank is maintained substantially constant.

2. In a liquid level control, a tank having a discharge outlet for drawing fluid therefrom, a pump motor for operating a pump to pump fluid into said tank having a connection to a source of alternating current, a pump control circuit for controlling the operation of said pump motor operable by the level of fluid in said tank including, a transformer having the primary coil connected across the source of alternating current and a secondary coil, one end of said secondary coil connected to ground, a pump relay having a coil therein, the other side of said secondary coil connected to one side of said coil, one normally open switch and one normally closed switch on said pump relay, the normally open switch including a contact and an arm that contacts said contact, the other end of said coil connected to said contact and to a short electrode mounted in said tank, said arm connected to a long electrode mounted in said tank in spaced relation to said short electrode, said tank grounded to make a circuit through said coil when the fluid level is in contact with said electrodes, and said normally closed switch adapted to make and break the connection between the source of alternating current and said pump motor as the circuit is made and broken through the coil on the pump relay with the rise and fall of the water level in the tank the combination with said pump control circuit of an electrical circuit for shorting said electrodes from the pump relay circuit including, electrically operated means for controlling the discharge of fluid from said tank, said electrically operated means having one contact thereon grounded, an arm actuated by said electrical means for making and breaking contact with said grounded contact as fluid is required from said tank, and a wire connecting said arm to the normally open switch of said water pump relay and said long electrode.

3. In a liquid level control, a tank having a discharge outlet for drawing fluid therefrom, a pump motor for operating a pump to pump fluid into said tank having a connection to a source of alternating current, a pump control circuit for controlling the operation of said pump motor operable by the level of fluid in said tank including, a transformer having the primary coil connected across the source of alternating current and a secondary coil, one end of said secondary coil connected to ground, a pump relay having a coil therein, the other side of said secondary coil connected to one side of said coil, one normally open switch and one normally closed switch on said pump relay, the normally open switch including a contact and an arm that contacts said contact, the other end of said coil connected to said contact and to a short electrode mounted in said tank, said arm connected to a long electrode mounted in said tank in spaced relation to said short electrode, said tank grounded to make a circuit through said coil when the fluid level is in contact with said electrodes, and said normally closed switch adapted to make and break the connection between the source of alternating current and said pump motor as the circuit is made and broken through the coil on the pump relay with the rise and fall of the water level in the tank the combination with said pump control circuit of an electrical circuit for shorting said electrodes from the pump relay circuit including, a valve relay for controlling the opening of said discharge outlet, at least one normally open switch and one normally closed switch on said valve relay, said normally closed switch connected to ground on one side, and means connecting the other side of said normally closed valve relay switch to said normally open switch on said pump relay to allow current flowing through said pump relay to pass to ground when the level of fluid in said tank is maintained constant.

References Cited in the file of this patent

UNITED STATES PATENTS

| | | |
|---|---|---|
| 1,820,981 | Le Fever | Sept. 1, 1931 |
| 2,213,961 | Hunter, Jr. | Sept. 10, 1940 |
| 2,259,771 | Oberly | Oct. 21, 1941 |
| 2,391,003 | Bowman | Dec. 18, 1945 |
| 2,462,019 | Bowman | Feb. 15, 1949 |
| 2,511,637 | Johannes | June 13, 1950 |
| 2,540,301 | Staege | Feb. 6, 1951 |